June 22, 1948.   C. B. FRANCIS   2,443,765
METHOD FOR THE UTILIZATION OF SPENT PICKLING ACID
AND CRUDE COKE WORKS AMMONIA IN THE MANUFACTURE
OF AMMONIUM SULPHATE AND IRON
HYDRATES OR OXIDES Filed July 2, 1945   4 Sheets-Sheet 1

INVENTOR:
CHARLES B. FRANCIS,
BY: John E. Jackson
HIS ATTORNEY.

FIG. 2.

June 22, 1948. C. B. FRANCIS 2,443,765
METHOD FOR THE UTILIZATION OF SPENT PICKLING ACID
AND CRUDE COKE WORKS AMMONIA IN THE MANUFACTURE
OF AMMONIUM SULPHATE AND IRON
HYDRATES OR OXIDES
Filed July 2, 1945 4 Sheets-Sheet 4

FIG.4.

INVENTOR:
CHARLES B. FRANCIS,
BY: John E. Jackson
HIS ATTORNEY.

Patented June 22, 1948

2,443,765

UNITED STATES PATENT OFFICE 2,443,765

METHOD FOR THE UTILIZATION OF SPENT PICKLING ACID AND CRUDE COKE WORKS AMMONIA IN THE MANUFACTURE OF AMMONIUM SULFATE AND IRON HYDRATES OR OXIDES

Charles B. Francis, Pittsburgh, Pa.

Application July 2, 1945, Serial No. 602,844

4 Claims. (Cl. 23—119)

This invention relates to the economic disposal of the spent pickling solution produced by steel works, also known as spent acid, spent pickling acid, and pickle liquor. More specifically, the invention has for its objects the treatment of spent pickling acid with ammonia and air to produce iron hydrates or oxides and ammonium sulphate of high quality, and particularly, the treatment of the spent pickling acids with the crude ammonia liquors, or vapors as they come from the ammonia stills used to recover the ammonia from weak liquors produced in the coking of coal by the by-product process, or in the manufacture of coal gases, to manufacture a grade of ammonium sulphate equal or superior to the usual grade of this salt produced by by-product coke works, with the recovery, if desired, of various organic and inorganic compounds, as hereinafter described.

While the treatment of spent pickling acid with ammonia, and with ammonia and air, to recover ammonium sulphate, iron oxides for pigments, or both, has long been known, it is thought that the process of my invention contains some features that are new to the arts relating thereto.

Before describing the operation of my process, I wish to call attention to the composition of the raw materials I utilize. Spent pickling acid is the term I employ to designate the spent liquors resulting from the necessary cleaning or pickling with sulphuric acid of various steel articles, such as sheets, that are to be cold rolled or coated, and tubes, wire, and other articles that are to be cold drawn or coated to give a superior finish. To start such cleaning operations, a solution containing 5 to 20% (50 to 200 g. per liter) of sulphuric acid with a small proportion of an organic substance to act as an inhibitor is heated to a temperature between 140° and 210° F. and the articles to be cleaned are immersed therein, the hot acid dissolving or otherwise detaching the scale or oxide and also dissolving some of the metal. As the acid is consumed, more is added until the concentration of ferrous sulphate reaches a point, usually between 10% and 30% of the solution, by weight, at which pickling becomes difficult, when the solution is discarded and is usually disposed of as a waste or evaporated to recover ferrous sulphate.

Besides, the unused acid, which may vary from 2 to 7%, and the inhibitor and the decomposition products of the inhibitors used, the discarded solution contains the sulphates of all the metals in the steels pickled. Therefore, the spent pickling solution, in general, represents a complex mixture of both soluble and insoluble matter, including free or uncombined sulphuric acid, silicic acid, organic compounds, the sulphates of iron, manganese, copper, nickel, chromium, molybdenum, aluminum, vanadium, columbium, lead, tin, etc., and the sulphides of those metals whose sulphides are insoluble in acid.

The same complexity of composition is characteristic of the crude ammonia liquors and vapors my process is adapted to use. For example, I may use either in vapor or condensed form all the ammonia containing vapors from the ammonia stills used for treating the so-called weak liquor obtained in the carbonization of coal by the usual by-product coke oven process.

These vapors or the concentrated ammonia liquors condensed from them represent very crude products containing many substances besides ammonia. These impurities may include ammonium carbonate, ammonium sulphide, ammonium cyanide, ammonium sulphocyanide, oxides of nitrogen, pyridine, water soluble waxes, benzene, toluene, phenol, traces of other phenolic compounds, such as catechol and pyrogallol, and other organic substances, including naphthalene, in even smaller proportions.

In accordance with the present invention, I describe a method relatively simple in operation, whereby these two crude mixtures, namely, spent pickling acid and crude coke works, or gas works, ammonia, may be treated with air under conditions of atmospheric pressure and comparatively low temperatures of 50° to 90° (122° to 194° F.) to recover ammonium sulphate and iron hydrates in commercially pure forms, and, if desired, other substances such as pyridine, and certain phenols. Furthermore, without changing the steps of my process and with the same apparatus, I may treat water solutions of either acid or neutral ferrous sulphate obtained from any source, such as, for example, from spent pickling acid which has been pretreated to crystallize out the ferrous sulphate and to recover the free acid for reuse. The method and apparatus by which I obtain these recoveries are described as follows:

Referring to the drawings.

Figure 1:
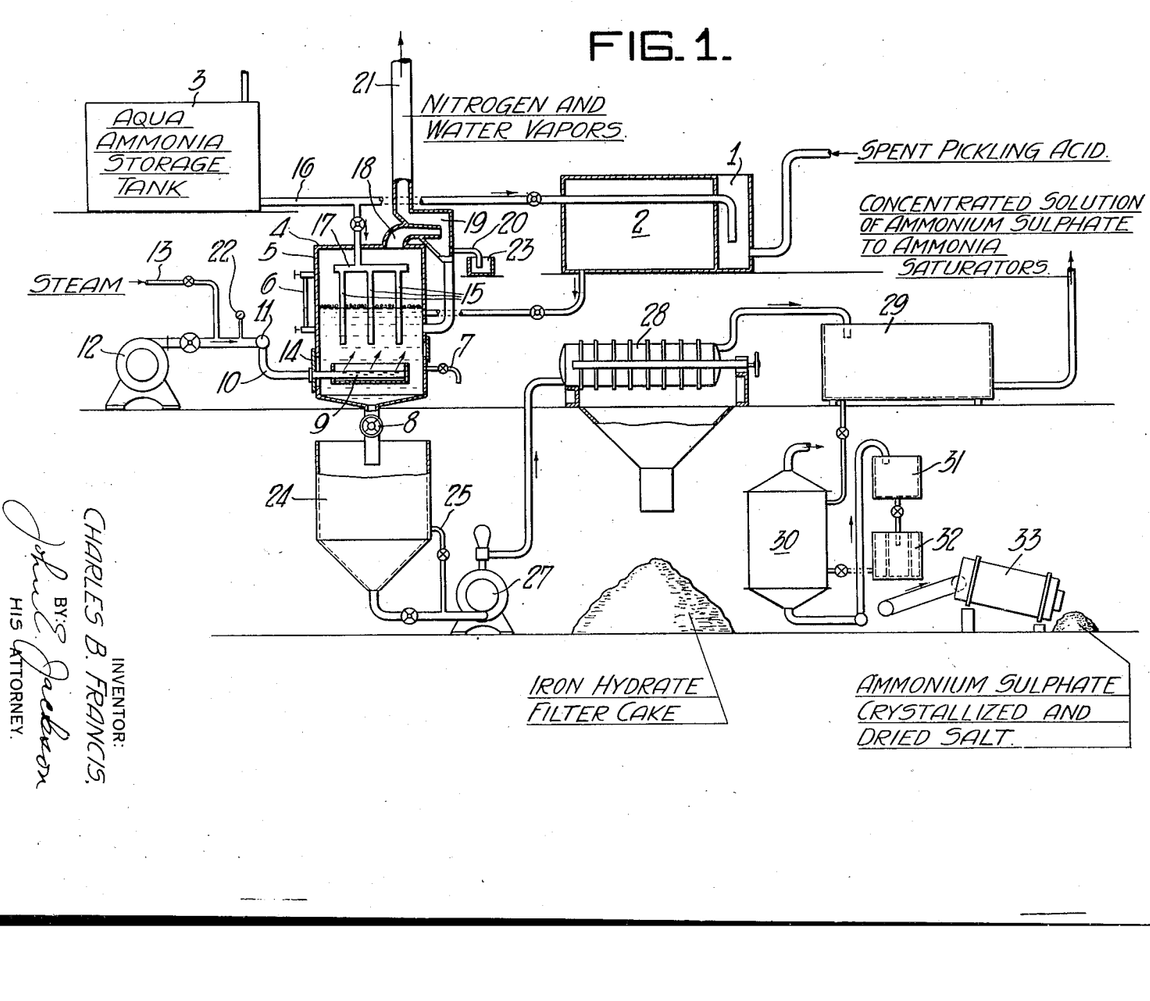
Figure 1 is a drawing indicating the various steps in the operation of my process and the equipment required, the different parts of which are described later.

Referring particularly to Figure 1, this view is a combined elevational view partly in section, and flow sheet indicating diagrammatically a system of apparatus required and the procedure followed in the simplest embodiments of my invention, in which aqua ammonia, either crude or purified to a degree, is employed to treat waste pickling acid in batches and produce commercially pure ammonium sulphate without regard to the purity of the iron hydrates formed or the recovery of other by-products. By reference to this diagram, the procedure followed and apparatus employed in carrying out the process to accomplish the results desired with any given batch or lot of spent pickling acid are indicated and described as follows:

Spent pickling acid, collected from the pickling vats, is introduced into a compartment 1 of storage tank 2 where it is brought into contact with sufficient crude aqua ammonia from storage tank 3 to adjust the acidity of the solution to between pH 2 and pH 4, this compartment being lined with a suitable corrosion resistant substance. With the pH value of the solution thus adjusted, all of the free acid is neutralized and all of the ferric iron is either reduced or precipitated, together with some of the silicic acid. Also, such metals as copper, molybdenum, zirconium and tin are precipitated by ammonium sulphide in the ammonia liquid; and the corrosiveness of the solution to steel is largely overcome, permitting the storage and feed tank 2 and succeeding apparatus to be made of plain steel, unlined or lined with corrosion resistant material, as desired. If the reaction chamber is lined with acidproof material, the spent pickling acid may be introduced directly into the reaction chamber and the free acid there neutralized, as an initial step prior to separating the iron.

From the combination neutralization and storage tank 1—2, the neutralized solution flows to a reaction chamber 4, where it is contacted with more of the crude ammonia liquor and air injected at the bottom of the chamber in the form of very small streams or bubbles to precipitate the iron in the form of a hydrate.

After iron is thus precipitated, the sludge is permitted to flow from the reaction chamber 4 into a settling tank 24, from which it is forced by pump 27 to the filter press 28. From the filter the iron hydrate is dropped as a wet cake, and the liquid containing the ammonium sulphate in solution is discharged into tank 29, from which the solution is withdrawn to recover ammonium sulphate by evaporation of the water, which may be effected in any of several different known ways.

The treatment of the solution in the reaction chamber 4 constitutes one of the novel features of the process of my invention; therefore, the construction of this chamber and its operation are described more in detail, as follows:

Reaction chamber 4 consists of several parts. The outer shell or wall 5 may be made of any suitable material, though I prefer it to be of steel. While this vessel is generally rectangular in all sections, it may have a horizontal cross section of any convenient form and size and may or may not be lined with an acid resistant metal or other materials, according to the procedure preferred in neutralizing the free acid. The height of the vessel, however, should be proportioned to the volume of waste pickling acid it is desired to treat at one time and the quantity of air introduced per minute. Usually, the height should be approximately twice the depth of liquid to be treated, which may vary from 3 to 5 feet, and I prefer a depth of approximately 4 feet. This vessel is provided with a glass gage tube 6 for determining the height of liquid in the vessel, and a small valve and outlet 7 near the bottom for sampling the liquid at intervals. The bottom of the vessel should be tapered downward, approximately as shown in the drawings, to an opening or openings closed with a valve or valves 8, all of relatively large size to empty the vessel quickly. Above the bottom is located one or more diffuser elements 9, used for diffusing into the liquid the air that is delivered through the tube 10 and manifold 11 from the blower, or air compressor 12. Pipe 13 is an inlet for steam, used when it is desired to raise the temperature of the liquid in the vessel and 14 is a gasketed opening through which the diffuser elements may be inserted into or removed from the vessel.

The diffuser elements may be of any of several types known to the art, but since many of these are made of porous material that clogs frequently, I prefer a special non-porous type constructed so as to reduce the clogging to a minimum.

Mounted directly over each diffuser 9 with openings 2 to 5 inches above the diffuser are the ammonia distributor tubes 15 which distribute the aqua ammonia delivered from tank 3 through tube 16 to manifold 17. It will be understood that these ammonia distributors may be of various forms with the manifold placed either outside or within the vessel, the form shown being most convenient for purposes of illustration. At the top of the vessel is an outlet 18 for the escape of gases and vapors which are chiefly composed of water vapor, nitrogen and other inert gases of the air introduced through the air diffusing device 9. As the liquid in the reaction chamber has a tendency to froth or foam during, and particularly at the end of, the operation of oxidizing and separating the iron, this outlet curves into a defrothing box 19 constructed as indicated in the drawings, with a tube leading to a point on the side of the vessel below the level of the liquid it contains, a liquid outlet 20 for use if and when it is desired to prevent the condensate from flowing back into the reaction chamber, and a gas outlet 21 which should empty into the open air out of doors.

This reaction chamber is operated as follows: With the chamber empty, air is introduced at a pressure slightly in excess of that required to force it through the diffuser, or until the gage 22 indicates between 1 and 2 pounds. Waste pickling acid is then introduced into the reaction chamber to the desired depth of approximately four feet, the air pressure being increased from 2 to 3 or 4 pounds, plus the differential pressure through the diffuser. If it is desired to raise the temperature of the liquid, which should be 50° C. (122° F.) or higher, steam is admitted with the air. As the liquid reaches the desired level, crude aqua ammonia from tank 3 is admitted to the distributor tubes and thus contacted with the waste pickling acid.

The aqua ammonia is fed into the reaction chamber at a rate proportioned to the rate of feeding air. Usually I introduce the air at a constant pressure, say four pounds, over that required to force it through the diffuser, and regulate the flow of aqua ammonia, which may vary greatly in its ammonia content, accordingly, to maintain the hydrogen ion concentration of the solution at predetermined values to give the type of iron precipitate desired, and effect precipitation of other elements.

For precipitation of all metals that may be present, the hydrogen ion concentration is controlled at different stages over a range from pH 2 to pH 11, but for the precipitation of the ferric iron this range is from pH 2 to pH 6. See Figure 2 in this connection. To obtain a filterable precipitate I prefer to effect precipitation of the iron either with the solution at a temperature between 50° and 60° C. and slightly above pH 2, the point at which incipient precipitation of ferric iron occurs, or at the point of incipient precipitation of ferrous iron, which occurs between pH 5 and pH 6 with the solution at a temperature around 80° C., say, 60° to 90° C., as any temperature above 90° C. results in loss of ammonia with escape of excess air.

From this description it is obvious that my complete process is carried out in four steps, including (1) neutralization of the spent pickling acid; (2) treatment of the neutralized solution with air and crude ammonia to form ammonium sulphate and free the solution of impurities by precipitation; (3) separation of the solution of ammonium sulphate solution from insoluble compounds formed in the two preceding treatments; and (4) treatment of the solution by evaporation or otherwise to recover ammonium sulphate. It is also apparent that any novel features of my process must reside in the method of carrying out steps 1 and 2, which are, therefore, described in detail as follows, reference being had to Figure 2 in this connection.

In the neutralization step, the crude ammonia, containing impurities as previously listed, is added directly to and mixed with the spent pickling solution, without regard to time, but in amount sufficient to neutralize the free acid, that is, in amount sufficient to increase the pH value of the solution to a predetermined point between pH 2 and pH 4, which, for reasons stated later is preferably pH 4. In this operation the chemical changes that take place vary, somewhat according to the constituents of the spent pickling solution and the crude ammonia, and are briefly listed as follows:

I. The free acid in the pickle liquor is neutralized by the various ammonium compounds in the crude ammonia to form either acid ammonium sulphate or neutral ammonium sulphate and water, or water and carbon dioxide, with more or less hydrogen sulphide and hydrocyanic acid as indicated by the following type reactions:

1. (a) $H_2SO_4 + 2NH_4OH \rightarrow (NH_4)_2SO_4 + 2H_2O$
   (b) $H_2SO_4 + NH_4OH \rightarrow NH_4HSO_4 + H_2O$
2. $2H_2SO_4 + (NH_4)_2CO_3 \rightarrow 2NH_4HSO_4 + H_2O + CO_2$
3. $H_2SO_4 + (NH_4)_2S \rightarrow (NH_4)_2SO_4 + H_2S$
4. $H_2SO_4 + (NH_4)_2CN \rightarrow (NH_4)_2SO_4 + HCN$ It is to be noted that the ammonium sulphates formed in Reactions 1 and 2 may be either acid or neutral, according to whether or not the ammonia liquor is added to pH 2 or pH 4.

II. Any ferric sulphate present in the spent pickling solution is either reduced and partly precipitated by the hydrogen sulphide or precipitated as ferri-ferro cyanide. If, as is seldom the case, the ferric sulphate in the spent pickling solution is exceptionally high, or the ammonia is exceptionally pure, any ferric sulphate in excess over the sulphide and cyanide in the ammonia used reacts with ammonium hydroxide or carbonate to precipitate the ferric iron as ferric hydroxide, or a hydrated ferric oxide.

The hydrogen sulphide liberated in I—3 will also precipitate copper, molybdenum, tin, and the like contained in the spent pickling solution.

III. Silicic acid is also partly precipitated, and such elements as zirconium and tin are completely precipitated by hydrolysis in this step.

In the second step, therefore, the solution to be treated consists mainly of a fairly concentrated solution of ferrous sulphate, containing considerable neutral and acid ammonium sulphate, with smaller proportions of other sulphates, mainly manganous sulphate. In the manufacture of commercial ammonium sulphate it may or may not be necessary to eliminate the manganese along with the iron, depending upon the use to which the sulphate is to be applied.

To eliminate the iron, a sufficient portion of this neutralized solution is transferred to the reaction chamber and treated with diffused air and crude ammonia as previously described, the use of air in the manner described being necessary because type reactions 5—a and 5—b below, representing the reaction between ferrous sulphate and ammonium hydroxide, are reversible.

5. (a) $2FeSO_4 + 2NH_4OH \rightleftarrows$ $(NH_4)_2Fe(SO_4)_4 + Fe(OH)_2$
   (b) $(NH_4)_2Fe(SO_4)_4 + 2NH_4OH \rightleftarrows$
   $4(NH_4)_2SO_4 + Fe(OH)_2$ By adding pure ammonia rapidly and injecting air into the mixture resulting from these reactions, to effect oxidation of the ferrous hydroxide, $Fe(OH)_2$, the reaction can be made to proceed to the complete precipitation of the iron, but the operation is slow and the resulting precipitate is difficult to filter. Besides, the character of the precipitate obtained is altered by the presence of ammonium carbonate, sulphide and cyanide, so that with crude ammonia and air applied in this manner, I have found that complete precipitation of the iron is so difficult as to appear well nigh impossible of attainment in a process designed for commercial application. Temperature within the range 30° C. to 80° C. has only a moderate effect in improving the filtering characteristics of the precipitate.

However, I have found that, by controlling the temperature and the pH value of the solution during the treating operation, the iron can be rapidly precipitated in either of two forms that can be filtered and washed to give a relatively pure solution of ammonium sulphate, and that to have the iron precipitate in either one of these forms requires a separate set of conditions.

Thus, to obtain one type of precipitate, which is the less desirable of the two from the standpoint of filtering and washing, I adjust the temperature of the neutralized solution to between 50° C. and 60° C., mainly to increase the speed of the reactions and shorten the time of the process; diffuse air into the solution as rapidly as possible; and simultaneously add the crude ammonia gradually and continuously to maintain the acidity of the solution at pH 2 and pH 3, that is, at the point of incipient precipitation of ferric iron.

Under these conditions of relatively low temperature and slight acidity of the solution, a number of chemical reactions must take place to result in the precipitation of the iron, which reactions with ammonium hydroxide and air are represented as follows:

6. $4FeSO_4 + 4NH_4HSO_4 + O_2 \rightarrow$
$2Fe_2(SO_4)_3 + 2(NH_4)_2SO_4 + 2H_2O$ 7. $2Fe_2(SO_4)_3 + 6NH_4OH \rightarrow$
$2Fe_2O_3.H_2O + 2NH_4HSO_4 + 2(NH_4)_2SO_4$ 8. $2Fe_2(SO_4)_3 + 6NH_4OH + 3H_2O \rightarrow$
$2Fe_2O_3.3H_2O + 6NH_4HSO_4$ 9. $2Fe_2(SO_4)_3 + 12NH_4OH \rightarrow$
$4Fe(OH)_3 + 6(NH_4)_2SO_4$ From Reaction 6 it is apparent that the operation of the process of my invention under the given set of conditions depends upon the preoxidation of ferrous sulphate to ferric sulphate, and that this oxidation is effected by reaction of ferrous sulphate with acid ammonium sulphate and the oxygen of the air injected into the solution. Reactions 7, 8, and 9 are given along with Figure 2 to emphasize the importance of starting with a slightly acid solution (pH 2 to pH 3) and of adding the ammonia liquor gradually and at a rate corresponding to the rate of oxidizing the ferrous sulphate, in order to have the iron precipitate in the form of a granular hydrous ferric oxide. If the ammonia is added too rapidly, decreasing the acidity of the solution, say to pH 4, the iron will be precipitated as ferric hydroxide, which at low temperatures is in the form of a gel, very difficult to filter and wash, and the reactions may be brought to a stop, as it is evident from Reaction 6 that the oxidation of ferrous sulphate can proceed only so long as free acid is available.

With pure ammonia, the hydrated oxides are yellow, but with crude ammonia, they are highly discolored, for reasons explained as follows:

Under these conditions of precipitation ammonium carbonate is decomposed and most of the $CO_2$ formed is carried out with the air. But any ammonium sulphide in the crude ammonia reacts with free acid formed in the oxidation and precipitation of the iron to form hydrogen sulphide, which in turn reacts with ferric sulphates to form ferrous sulphate and sulphur. The ferrous sulphate, of course, is reoxidized, but the free sulphur may react with cyanide to form sulpho-cyanate, which prevents precipitation of some of the iron. Otherwise, the cyanides combine with ferrous and ferric compounds to form highly colored insoluble iron cyanides, and since toward the end of the operation the presence of ammonium carbonate alters the reactions somewhat and some ferrous sulphide may be formed, the color of the precipitate obtained is variable and generally dark.

Finally, to precipitate other elements the crude ammonia is added rapidly to the solution to pH 7, to precipitate elements such as aluminum, or to pH 11 to precipitate manganese.

To obtain the other type of precipitate, which is the more desirable from the standpoint of filtering and obtaining a purer solution of ammonium sulphate, I proceed as follows: First, I add the crude ammonia to the point of incipient precipitation of ferrous hydroxide. This adjustment may be made before the solution is admitted to the reaction chamber, or afterwards. If made in the reaction chamber, the ammonia is added rapidly, immediately after this vessel has been filled to the correct level, until the solution shows a pH value of 4 to 5.5, as determined by trial with the means at hand, or until there is other evidence that a black precipitate has started to form. The rate of adding the crude ammonia is then decreased to maintain the acidity of the solution between pH 4 and pH 5, while the temperature is raised to between 70° and 80° C. to shorten the time of the operation and also obtain a more granular-like precipitate that can be readily filtered and washed. As soon as a test shows that substantially all of the iron has been precipitated, the rate of adding the crude ammonia is increased until the solution is at pH 7 to precipitate such elements as aluminum, or at pH 11 to precipitate manganese. The reaction vessel is then drained into a third vessel, where the precipitate is permitted to settle preliminary to filtering the solution.

By this procedure the precipitate obtained differs markedly from that obtained by oxidizing and precipitating the iron under conditions of lower temperature and higher acidity, in that after preparing the precipitate with pure ammonia then filtering and drying at 90° to 100° C., it is found to be highly magnetic and to be composed of iron and oxygen in a proportion corresponding to the formula $Fe_3O_4$. As I obtain the precipitate with crude ammonia it is highly contaminated with ferrous sulphide and other impurities. My explanation of the formation of the precipitate under the conditions of the process as described above is as follows:

When ammonia containing carbonate and sulphide is added to the solution of ferrous sulphate to the point of incipient precipitation of iron in the ferrous state, these substances first react to form ferrous hydroxide, carbonate and sulphide as represented by the following reactions:

10. $2FeSO_4 + 2NH_4OH \rightarrow$
$Fe(OH)_2 + (NH_4)_2Fe(SO_4)_2$
11. $FeSO_4 + (NH_4)_2CO_3 \rightarrow FeCO_3 + (NH_4)_2SO_4$
12. $FeSO_4 + (NH_4)_2S \rightarrow FeS + (NH_4)_2SO_4$ Both ferrous hydroxide, $Fe(OH)_2$ and ferrous carbonate, $FeCO_3$, have a strong affinity for oxygen, so that with air being diffused into the solution, they are rapidly oxidized, while the ferrous sulphide remains unchanged. Assuming that water may play a part in the process, these oxidation reactions are represented as follows:

13. $4Fe(OH)_2 + O_2 + 2H_2O \rightarrow 4Fe(OH)_3$ or $4H_3FeO_3$
14. (a) $4FeCO_3 + O_2 + 6H_2O \rightarrow 4Fe(OH)_3 + CO_2$ or
(b) $2FeCO_3 + O_2 + 2H_2O + 2NH_4OH \rightarrow$
$2Fe(OH)_2 + (NH_4)_2CO_3$ The ferric hydrate, $Fe(OH)_3$ or $H_3FeO_3$, is recognized as an acid of iron while ferrous hydroxide is a base, and both are initially precipitated as a sol or gel. In the operation of the process both are being formed continuously and simultaneously. Consequently, they react as rapidly as iron hydrate or carbonate is oxidized, presumably to form a hydrated form of the magnetic oxide, $Fe_3O_4$, thus, 15. (a) $Fe(OH)_2 + 2Fe(OH)_3 \rightarrow$
$Fe_3(OH)_3$ or $Fe_3O_4.4H_2O$
(b) $Fe(OH)_2 + 2Fe(OH)_3 \rightarrow Fe_3O_4 + 4H_2O$ By preheating the solution to around 80° C., or as hot as permissible to avoid undue loss of ammonia, the compound, $Fe_3(OH)_3$, may be wholly or partially dehydrated, in which case the reaction is more correctly represented by Reaction 15—b. Irrespective of its exact nature and composition, the precipitate I obtain is not a gel, but a crystalline or granular substance readily filtered and easily washed because it does not occlude ammonium sulphate as does a gelatinous precipitate. It should be noted that the process may be looked upon as taking place in two stages. In the first stage the process is represented by Reactions 10, 11, and 12, in which the ammonium compounds react with ferrous sulphate; while in the second stage, the ferrous sulphate is replaced by the double salt $(NH_4)_2Fe(SO_4)_2$. This condition is cited as a possible explanation of the fact that it is sometimes necessary to raise the pH value of the solution to pH 6 to effect complete precipitation of the iron, a precaution that is always observed to effect precipitation of aluminum, if present. Also, if it is desired to remove manganese completely, ammonia must be added to increase the alkalinity of the solution to pH 11.

Figure 2:
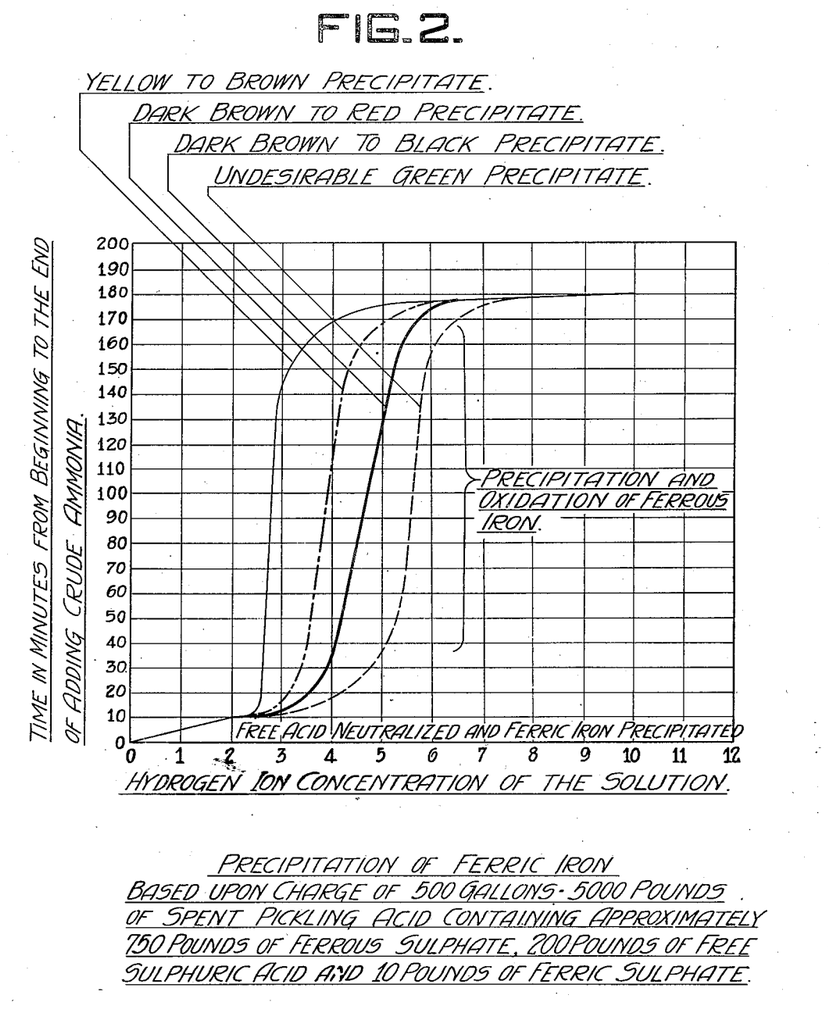
Figure 2 is a set of curves in which the pH value of the solution, starting with spent pickling acid containing about 4% free acid, 15% ferrous sulphate and 0.2% ferric sulphate is plotted against time. The curves are also made to indicate changes in the character of the precipitate obtained by feeding the ammonia at different rates.

Care to avoid adding ammonia too rapidly during the oxidation period is necessary to obtain a filtrable precipitate. If the ammonia is added rapidly so as to precipitate ferrous hydroxide and carbonate faster than air sufficient to effect the oxidation as represented, the precipitate will be more or less gelatinous with a tendency to occlude ammonium sulphate, as indicated by the curves of Figure 2 as well as by the reactions given above.

Following precipitation of all of the iron by either modification of my process, the sludge-like solution is drained from the reactor into a separate tank, where the precipitate is permitted to settle, after which the solution is filtered and the precipitate washed with the minimum amount of water necessary to remove ammonium sulphate. The filter cake is then discarded, and the solution is evaporated or otherwise treated for the recovery of ammonium sulphate by methods involving crystallization and further treatment of the mother liquor as circumstances may require.

Figure 4:
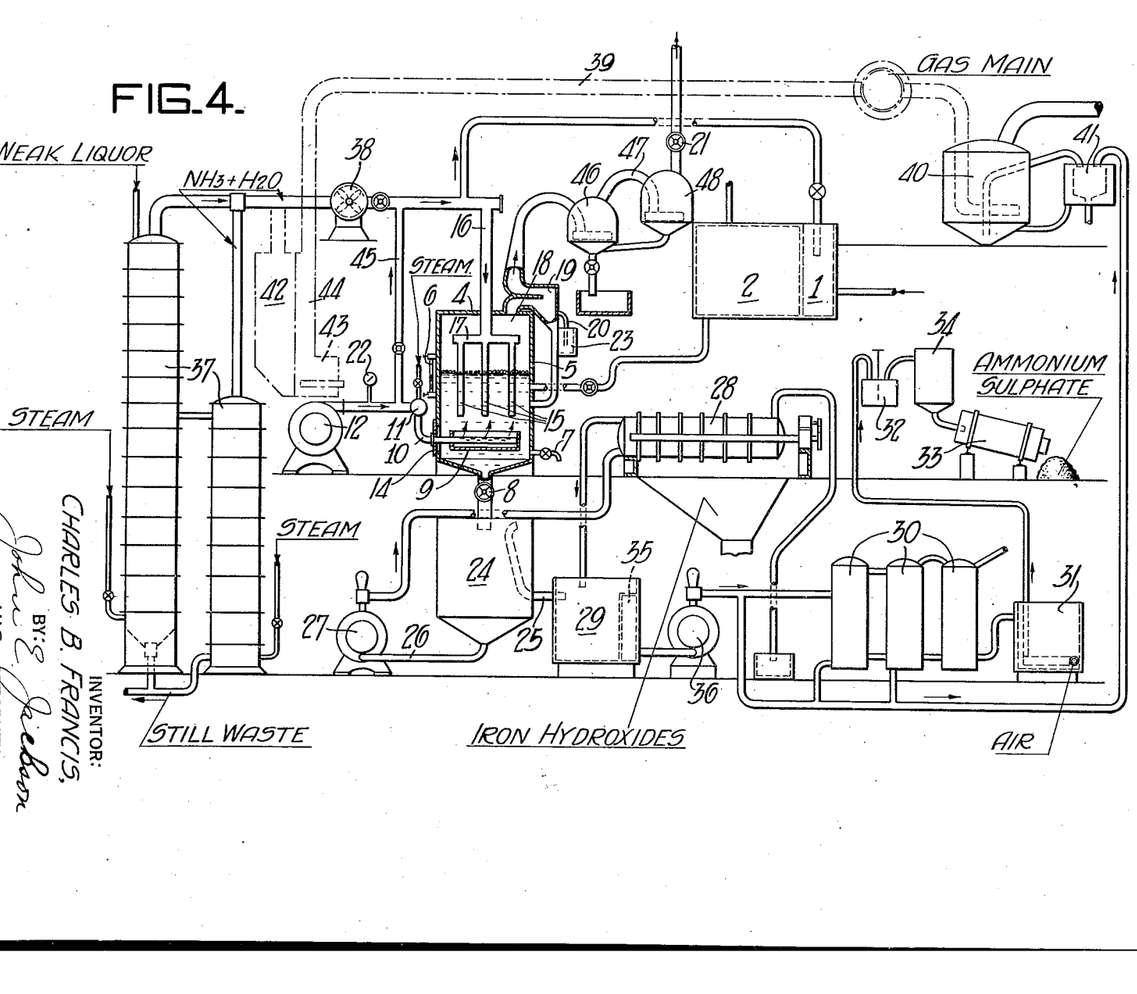
Figure 4 is a flow sheet indicating how the equipment required by my process may be connected directly to the by-product ammonia equipment of a coke or gas works.

The recovery of pyridine and other by-products of the process are also possible, by scrubbing the gases escaping from the reactor with suitable reagents and equipment, as indicated in the flow sheet of Figure 4.

Figure 3:
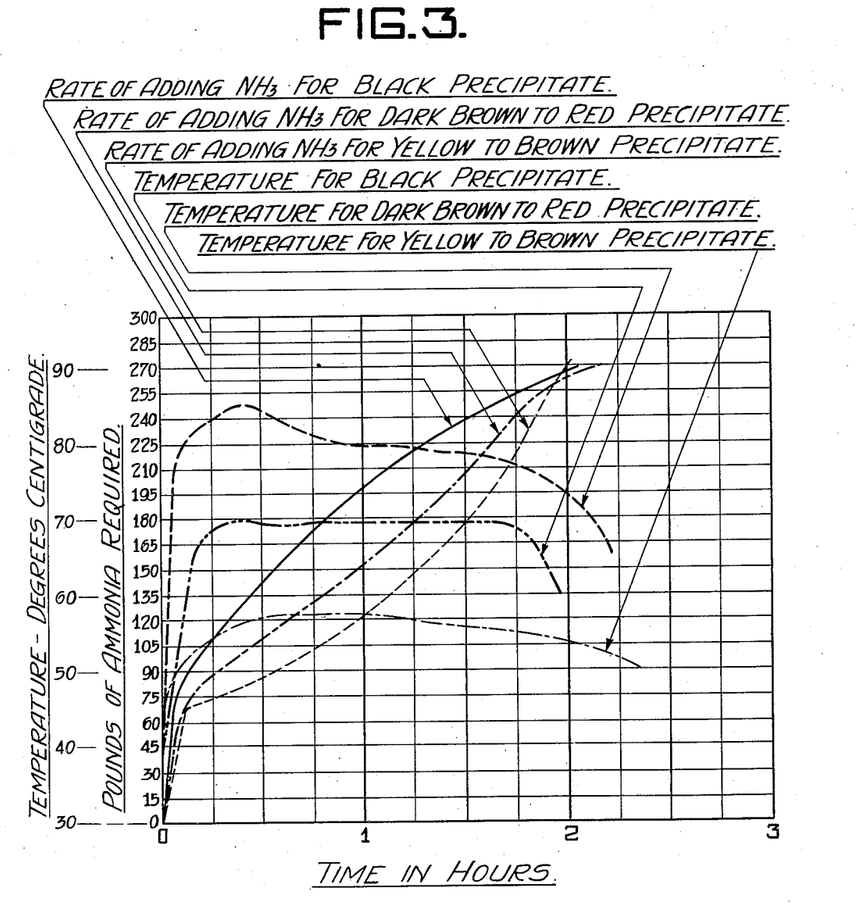
Figure 3 is a set of curves showing temperature in degrees centigrade and pounds of ammonia plotted against the time required to precipitate substantially all of the iron.

Having thus described the operation of and reactions in the reaction chamber, I desire to point out that full control of the process is necessary to complete success and accordingly explain my methods of control as follows:

In laboratory experiments performed in glassware, temperature and the color changes serve as indicators for regulating the addition of ammonia, but in large scale operations carried out in containers, made of opaque materials, such as steel, other means must be employed:

To begin, it is evident the process is carried out in four steps, namely, (1) neutralization of the free acid in the waste pickling acid, (2) precipitation of any iron present in the ferric condition, (3) precipitation and oxidation of the major portion of iron, which is in the ferrous condition, and (4) a finishing period in which excess ammonia is added to precipitate elements such as manganese, and free the solution of organic compounds, such as phenol and pyridine, which are volatile under the conditions of excess ammonia, elevated temperature and diffused air. Without proper tests or equipment control is difficult, because both the aqua ammonia and the spent pickling acid vary greatly in their contents of reacting substances. Also, the diffused air varies with different types and kinds of diffusers, but by using the same kind and types of diffuser and feeding air at different pressures, it is possible to fix upon a pressure that results in most efficient rate for the diffuser in use. With the air fed under these conditions, there are the three factors of time, temperature, and hydrogen ion concentration that may be employed to control the process. The relations of these factors to rate of feeding ammonia are shown on the accompanying curves of Figures 2 and 3. Referring to Figure 2, there is illustrated the hydrogen ion concentration for each step of the process to obtain any of the several possible types of precipitate, which can be translated into terms of rate of adding ammonia as shown in Figure 3, because the precipitation and oxidation of ferrous iron is brought about in a limited period of time of not less than 2 or more than 3 hours. With practice an operator acquires other means of control. For example, if the ammonia is fed too fast in proportion to the air, frothing of the solution becomes excessive, and such frothing may be used as an indication to regulate the rate at which ammonia is fed. Also the color of the mixture assumes a greenish tint when either the ammonia is delivered at too fast a rate or the diffusing air is delivered at too slow a rate. With the ammonia added at the proper rate, the only factor remaining is temperature which may be easily controlled in different ways, but which I prefer to control with steam introduced with the air or with the ammonia. The flexibility of the process is such that wide variations in the rate of adding ammonia results merely in lengthening or shortening the time for precipitating and oxidizing the ferrous iron, unless it is desired to obtain a type of precipitate other than the black.

Following the complete oxidation and precipitation of the iron and of other elements possibly present which it may be desirable to separate from the solutions, the remaining steps of the process are carried out in a more or less conventional manner. However, one novel feature may be introduced in these later steps, as is evident from the following:

As previously stated the mixture, resulting from the treatment in reaction chamber 4, is transferred to another vessel, designated by the numeral 24 in Figure 1.

From this tank 24, the treated mixture, after settling is drawn off or decanted through tube 25 to pump 27, which forces the clearer liquid to filter press 28. Then the sludge in the bottom of tank 24 is likewise forced through the filter press until cakes of the desired thickness have been built up, when the hydrate is washed with water to remove ammonium sulphate held by the iron hydrates. Although I prefer a filter press, any other suitable method of filtering known to the art of filtration and separation of solids from liquids may be used with or without prior settling.

The filtrate and washings represent a concentrated solution of ammonium sulphate which may be disposed of in different ways. For example, if the treatment of the waste pickling acid is carried on at a coke works, these liquors may be substituted for the wash water used in washing the ammonium sulphate produced from the free ammonia in the gas (apparatus not indicated on the diagram), thus saving the cost of evaporating the water. In lieu of such an outlet for the disposal of the solution of ammonium sulphate, the filtrate and washings are collected in tank 29, from which they are delivered, after adjustment of the alkalinity with sulphuric acid to pH 5-6, to a suitable type of evaporator 30, the object of this addition of acid being to avoid loss of the excess ammonia and prevent frothing of the solution in the evaporator. In the evaporator, the excess water is vaporized to the point of a saturated solution of ammonium sulphate at room temperatures and pumped to tank 31. In the filtering and evaporating operations, the solution may have picked up some ferrous iron. This iron I remove by passing diffused air through the solution, after adjusting the pH value to about 6, if necessary, and finally adjusting the alkalinity to pH 9 to remove some manganese, if present, the adjustment of the pH values being accomplished by treating the solution simultaneously with the air and ammonia. The precipitated hydrates are removed by centrifuge 32 or by filtering, and the evaporation of the solution and crystallization of the ammonium sulphate is continued, by conventional methods, the crystals being dried in a drier 33 by methods well known in the art. If the plant is located adjacent to a coke works by-product house, the hot solution saturated with ammonium sulphate may be conducted into the ammonia saturators where the salt may crystallize with that found in the saturators.

A special advantage in clarifying the solution of ammonium sulphate after evaporation to saturation is that not only iron but other inorganic compounds and some organic substances are precipitated by the well known physico-chemical phenomenon commonly known as salting out, in which the increase of concentration of a given ion in solution combined with others causes precipitation of the less soluble compounds combined with ions of opposite sign.

Finally, it should be noted that the reactions of ammonia and air with ferrous sulphate are exothermic, and very little additional heat, if any, is required by my process, provided either the waste pickling acid and the aqua ammonia are fed at temperatures sufficiently high. For example, if the waste pickling acid, which is usually emptied from the pickling tanks at temperatures above 150° F., (65° C.), is delivered to the reaction chamber at a temperature of 122° F. (50° C.) and the aqua ammonia at 102° F. (40° C.), steam sufficient to heat the air to about 160° F. (71° C.) will suffice to give a filterable precipitate. In some situations of applying the process as I describe subsequently, in which the vapors from the ammonia stills are conducted directly into the reaction chamber, the waste pickling acid may be used at a lower temperature and the air need not be heated except when it is very cold as in winter.

Figure 4 is a sectional view of apparatus and flow diagram of materials of a modification in my process indicating how it may be adapted to utilize the hot vapors from the coke works ammonia stills and to recover pyridine and other products therefrom, if desired.

By this plan spent pickling acid may be admitted from storage tank 2 to the reaction chamber 4 and treated with diffused air and a mixture of air, ammonia, and water vapors from the ammonia stills 37, the vapors from both the free still and the fixed still being used. Ordinarily these vapors pass through a tube 39 to the gas main, where they mix with the gases from which they were condensed and are scrubbed with sulphuric acid in a vessel 40, known as a saturator. The ammonia reacts with the acid in this chamber to form ammonium sulphate, which crystallizes and settles to the bottom of the vessel, whence they are pumped to a centrifugal drier 41, washed with water, and then dried.

With a number of chambers in operation, it is possible and practicable to operate them in order to consume all the ammonia as rapidly as it is supplied by the stills. Also, if the quantity of waste pickling acid is insufficient to consume all the ammonia produced by the stills, the arrangement provides for the consumption of the excess ammonia in the usual manner. With such an arrangement it may be necessary to include only the fan 38 and the necessary tubing as additional equipment to maintain a constant pressure on the stills and overcome the liquid head in the reaction chamber. Air from blower 12 may be conducted through tube 45 and mixed with the ammonia and steam from the stills just before they enter the reaction chamber. If it is desired to keep the volume of the treated solution as low as possible, the vapors from the stills may be passed through a condenser 42, where they are cooled only sufficiently to condense the water at some temperature near the boiling point. Although mixtures of air and ammonia in certain proportions explode on ignition, the water vapors in these mixtures render the mixtures in any proportions nonexplosive. At the bottom of the condenser this hot liquid flows into a low chamber in which the condensate is treated with diffused air introduced through the diffuser tube or tubes 43, and if it is desired, I may add portions of the filter cake from time to time to react with the cyanides and sulphides and thus prevent them from passing into the reaction chamber. This air is finely dispersed in the liquid, and not only helps to dispel the ammonia vapor but also oxidizes many of the organic substances held in solution in the liquor, transforming them to less volatile compounds and preventing them from being carried over into the reaction chamber. In the reaction chamber this air keeps the ammonia distributor tubes 15 clean and helps to oxidize the ferrous hydrate as it is formed.

The heat from the vapors also keeps the temperatures of the solution at a higher level, and this temperature, in conjunction with the diffused air, carries certain substances, notably pyridine and phenol, out of the reaction chamber. To recover these compounds, I place absorbers 46 and 48 after the defrothing chamber 19. In absorber 46 the exit gases pass through a solution of sulphuric acid to absorb pyridine and ammonia. From this slightly acid solution, pyridine is recovered by evaporating excess water, then treating with pure ammonia and distilling as in the conventional methods. I may also use acid in the second absorber 48, unless it is desired to recover such substances as phenol, when I may use a dilute solution of sodium hydroxide to scrub the gases before they are forced to the open air. Also, if the build up of pyridine and other organic bases in the ammonium sulphate solution is not objectionable, spent pickling acid may be substituted for the sulphuric acid in these scrubbers and the overflow therefrom conducted into the reaction chamber for precipitation of the iron, etc.

After iron in the spent pickling acid has been completely separated, the quantity of ammonia admitted is gradually reduced to zero, while the air flow is maintained to better remove the last of the pyridine and phenols, which are relatively volatile in mixtures of air and ammonia.

The sludge is then discharged if desired into settling tank 24 and allowed to settle for a period, when the clear supernatant liquid is decanted into tank 29, and the sludge pumped to the filter and the filter cake washed as has already been described. The liquid in tank 29 may contain traces of precipitate carried over with the decanted liquid, and to remove this the liquid is drawn off through filter tube 25 to give a water white solution of ammonium sulphate, which may be further treated to recover ammonium sulphate by any of the methods already described.

If it is desired to use the solution, which contains at this stage, 15 to 25% ammonium sulphate by weight, to manufacture a very pure or special grade of ammonium sulphate, the liquid is evaporated and the salt crystallized and dried as described before.

Regarding apparatus in general, it will be understood that various types may be used and various improvements made over the parts indicated in the drawings, without materially changing the nature of the process or the operations and steps by which its various objectives may be attained.

Also, various minor modifications in the manner of carrying out the process may be made without exceeding the scope of the invention, as defined by the following claims.

This application is a continuation-in-part of my copending application, Serial No. 390,000, filed April 23, 1941, now abandoned.

I claim:

1. An improvement in the art of making commercially pure ammonium sulphate from crude coke works ammonia derived from volatile matter evolved during coking of bituminous coal and including acidic gases, pyridine, phenolic compounds, and other contaminating materials, which includes the steps of adding the said ammonia to a spent solution containing ferrous sulphate and free sulphuric acid until the free acid of the solution is neutralized and the solution has a determined hydrogen ion concentration represented by a pH value of approximately $pH_2$, then continuing adding the ammonia to the solution while aerating the solution by diffusing air therein, controlling addition of ammonia to maintain the hydrogen ion concentration of the solution between pH values of substantially pH 2 and pH 6 while continuing to aerate the solution, the foregoing steps being carried out at substantially atmospheric pressure, the said solution being heated to between 50° C. and 90° C. to precipitate the iron in the presence of the said ammonia and air, a temperature of from 50° C. to 60° C. being used to precipitate the iron in a ready filterable condition at the pH value of substantially pH 3, a temperature of from 70° C. to 90° C. being used to precipitate the iron in a readily filterable condition when the pH value of the solution is substantially pH 5, separating the resulting insoluble matter from the solution, and recovering commercially pure ammonium sulphate from the said solution.

2. An improvement in the art of making commercially pure ammonium sulphate from crude coke works ammonia derived from volatile matter evolved during coking of bituminous coal and including acidic gases, pyridine, phenolic compounds, and other contaminating materials, which includes the steps of adding the said ammonia to a spent solution containing ferrous sulphate and free sulphuric acid until the free acid of the solution is neutralized and the solution has a determined hydrogen ion concentration represented by a pH value of approximately pH 2, then continuing adding the ammonia to the solution while aerating the solution by diffusing air therein, controlling addition of ammonia to maintain the hydrogen ion concentration of the solution between pH values of substantially pH 2 and pH 6 while continuing to aerate the solution, the foregoing steps being carried out at substantially atmospheric pressure, the said solution being heated to between 50° C. and 90° C. to precipitate the iron in the presence of the said ammonia and air, a temperature of from 50° C. to 60° C. being used to precipitate the iron in a readily filterable condition at the pH value of substantially pH 3, a temperature of from 70° C. to 90° C. being used to precipitate the iron in a readily filterable condition when the pH value of the solution is substantially pH 5, then after complete precipitation of the iron, continuing to add ammonia until the pH value of the solution reaches at least pH 9, separating all insoluble matter from the solution, and recovering commercially pure ammonium sulphate from the said solution.

3. An improvement in the art of making commercially pure ammonium sulphate from crude coke works ammonia derived from volatile matter evolved during coking of bituminous coal and including acidic gases, pyridine, phenolic compounds, and other contaminating materials, which includes the steps of adding the said ammonia to a spent pickling solution derived from sulphuric acid pickling of ferrous metals and containing ferrous sulphate and some free sulphuric acid until the free acid is neutralized and the solution has a hydrogen ion concentration value of approximately pH 2, continuing treatment of the resulting solution with further quantities of ammonia while passing finely divided streams of air into the solution, the foregoing steps being carried out at substantially atmospheric pressure, controlling addition of ammonia and air to maintain the hydrogen ion concentration of the solution at approximately pH 5 to pH 6 while heating the solution to between 70° C. and 90° C., thereby precipitating the iron from the solution in a readily filterable form, removing insoluble material from the resulting solution, and directly recovering ammonium sulphate from the said solution in marketable purity.

4. An improvement in the art of making commercially pure ammonium sulphate from crude coke works ammonia derived from volatile matter evolved during coking of bituminous coal and including acidic gases, pyridine, phenolic compounds, and other contaminating materials, which includes the steps of adding the said ammonia to a spent pickling solution derived from sulphuric acid pickling of ferrous metals and containing ferrous sulphate and some free sulphuric acid until the free acid is neutralized and the solution has a hydrogen ion concentration value of approximately pH 2, continuing treatment of the resulting solution with further quantities of ammonia while passing finely divided streams of air into the solution, the foregoing steps being carried out at substantially atmospheric pressure, controlling addition of ammonia and air to maintain the hydrogen ion concentration of the solution at from substantially pH 3 to pH 4, while heating the solution to between 50° C. and 60° C. until at least substantially all the iron is precipitated in a readily filterable condition, the ammonia and air being introduced into the solution at substantially atmospheric pressure, removing insoluble materials from the resulting solution, and recovering commercially pure ammonium sulphate from the said solution.

CHARLES B. FRANCIS.

REFERENCES CITED

The following references are of record in the file of this patent:

UNITED STATES PATENTS

| Number | Name | Date |
|---|---|---|
| 961,764 | Falding | June 21, 1910 |
| 1,424,635 | Fireman | Aug. 1, 1922 |
| 1,994,702 | Harris | Mar. 19, 1935 |

OTHER REFERENCES

Britton, Hydrogen Ions, p. 282 (1929), pub. by D. Van Nostrand Co., N. Y.